H. W. MERRITT.
Processes for Purifying Gas.
No. 209,350. Patented Oct. 29, 1878.
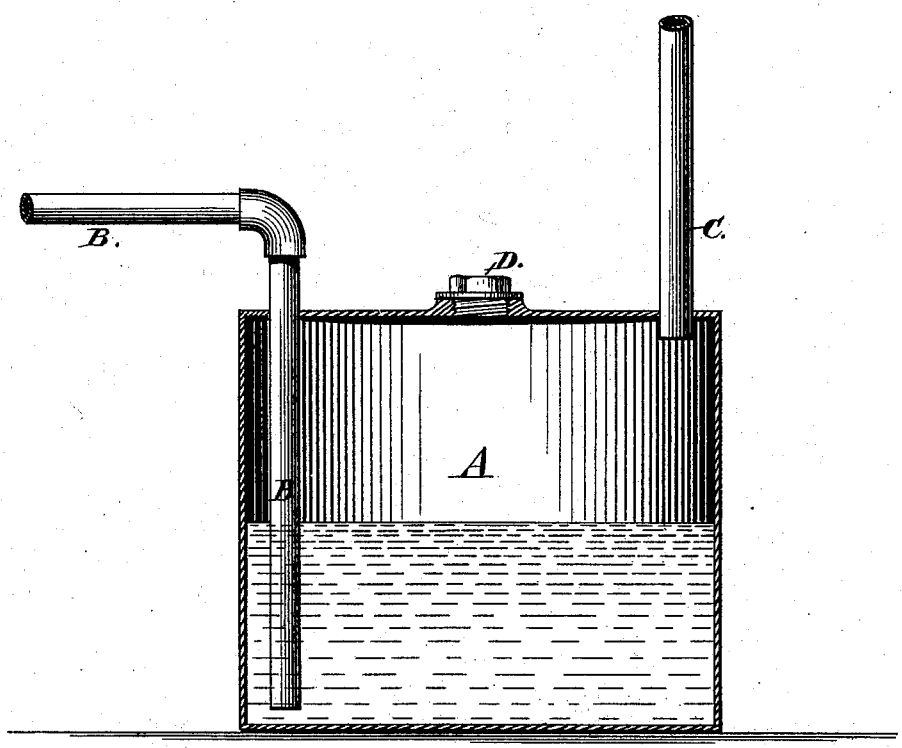
Attest:
H. L. Perrine
J. A. Rutherford
Inventor.
Henry W. Merritt.
By James L. Norris,
Atty.

UNITED STATES PATENT OFFICE.

HENRY W. MERRITT, OF SOMERVILLE, ASSIGNOR OF ONE-HALF HIS RIGHT TO WILLIAM H. IRELAND, OF BOSTON, MASSACHUSETTS.

IMPROVEMENT IN PROCESSES FOR PURIFYING GAS.

Specification forming part of Letters Patent No. 209,350, dated October 29, 1878; application filed June 8, 1878.

*To all whom it may concern:*

Be it known that I, HENRY W. MERRITT, of Somerville, in the county of Middlesex and State of Massachusetts, have invented certain new and useful Improvements in Purifying Illuminating-Gas, of which the following is a specification:

This invention relates to certain improvements in the manufacture of illuminating-gas, and it has for its object to purify the same in such manner as to render the flame of the gas comparatively free from smoke.

To this end the invention consists in an improved process and composition of matter for purifying carbureted-hydrogen or illuminating gas, or air charged with the vapors of the light hydrocarbons. Such gases, whether made from coal or the solid or liquid hydrocarbons, whether crude or purified, and the illuminating compounds consisting of air charged with the vapors of the light hydrocarbons, are found to contain small quantities of acetylene, together with an excess of carbon, both of which burn with an extremely smoky flame, and cause the flame of the illuminating-gas to smoke correspondingly.

It is the object of my invention to separate the acetylene and excess of carbon from such gases and compounds, and this I effect by passing the carbureted-hydrogen gas, or air charged with the vapors of the light hydrocarbons, through a solution of nitrate of mercury, as more fully hereinafter specified.

The drawing represents a sectional view of an apparatus or purifier which I have found convenient in carrying out my invention, but which, however, forms no part of said invention, and for which any other approved form of purifier may be substituted.

The letter A in said drawing represents a closed tank or vessel, constructed of lead or other suitable material, for holding the purifying compound, having inlet and exit pipes, B C, for the gas or carbureted air, and a suitable filling-aperture, D, for charging said vessel with the compound. The pipe B proceeds from a gas generator or holder, or rom a carbureter, and extends down to near the bottom of the liquid, so as to cause the gas or carbureted air to pass up through the same. The pipe C extends from the upper part of vessel A to a gas-holder or directly to the burners.

The improved compound may be formed directly in the purifier by decomposing the mercury therein by means of nitric acid; but, on account of the nitrous-acid fumes given off during the decomposition, which would impair the quality of the gas if left in the purifier, and which would be disagreeable if allowed to escape in the apartment in which said purifier is located, it is preferable to prepare the compound before placing it in the purifier in some place where the nitrous-acid gas or fumes may be allowed to escape without inconvenience.

The following proportions of nitric acid and mercury I have found to produce a completely soluble nitrate of mercury, which on that account I prefer to employ in practice, although other proportions may answer—viz., ten parts, by weight, of commercial nitric acid to four parts, by weight, of mercury. The mercury is placed in a suitable vessel, and the nitric acid added to the same, and the whole allowed to remain until decomposition is complete and the nitrous-acid gas or fumes have entirely escaped, leaving a clear solution nearly free from smell, which is ready for use in the purifier. The gas or carbureted air is then passed through the solution, which has a strong affinity for the acetylene and free carbon, and removes it from the gas or hydrocarbon vapor.

What I claim is—

The process herein described for purifying carbureted-hydrogen gas or carbureted air by passing the same through a solution of nitrate of mercury, substantially as specified.

In testimony that I claim the foregoing I have hereunto set my hand in the presence of the subscribing witnesses.

HENRY W. MERRITT.

Witnesses:
C. A. PAINE,
H. C. SOUTHARD.